United States Patent
Ribeiro, Jr. et al.

(10) Patent No.: US 11,133,982 B2
(45) Date of Patent: Sep. 28, 2021

(54) PROCESS FOR DEPLOYING A MESH NETWORK AND A MESH NETWORK NODE DEVICE

(71) Applicant: Robert Bosch Limitada, Campinas (BR)

(72) Inventors: Luiz Fernando L. Ribeiro, Jr., Campinas (BR); Ricardo Keigo de Sales Andrade, Campinas (BR)

(73) Assignee: Robert Bosch Limitada, Campinas (BR)

( * ) Notice: Subject to any disclaimer, the term of this patent is extended or adjusted under 35 U.S.C. 154(b) by 0 days.

(21) Appl. No.: 16/064,972

(22) PCT Filed: Nov. 25, 2016

(86) PCT No.: PCT/BR2016/050306
§ 371 (c)(1),
(2) Date: Jun. 21, 2018

(87) PCT Pub. No.: WO2017/106948
PCT Pub. Date: Jun. 29, 2017

(65) Prior Publication Data
US 2018/0375723 A1    Dec. 27, 2018

(30) Foreign Application Priority Data

Dec. 22, 2015 (BR) .................... BR1020150323115

(51) Int. Cl.
*H04L 12/26* (2006.01)
*H04L 12/24* (2006.01)
(Continued)

(52) U.S. Cl.
CPC ...... *H04L 41/0806* (2013.01); *H04L 41/0886* (2013.01); *H04W 12/08* (2013.01); *H04W 84/18* (2013.01)

(58) Field of Classification Search
USPC ....... 370/229, 230, 241, 246, 252, 315, 328, 370/338, 492, 501
See application file for complete search history.

(56) References Cited

U.S. PATENT DOCUMENTS 8,555,047 B2 * 10/2013 Malasani .............. H04W 12/04 713/1
2009/0125713 A1 * 5/2009 Karschnia ............. H04W 12/04 713/153

(Continued)

OTHER PUBLICATIONS

International Search Report and Written Opinion of PCT/BR2016/050306, dated Mar. 17, 2017 (17 pages).

(Continued)

*Primary Examiner* — Nguyen H Ngo
(74) *Attorney, Agent, or Firm* — Michael Best & Friedrich LLP

(57) ABSTRACT

A process for deploying a mesh network includes setting a first node device (1x) in configuration mode; setting a second node device (1x+1) in configuration mode so that the second node device (1x+1) is configured; setting the second node device (1x+1) in deployment mode and moving it away from the first node device (1x) until the second node device (1x+1) activates a radio communication range limit indicator (7); and setting one of the node devices in service mode so that it is ready for data traffic. A simplified mesh network node device (1) for deploying a network uses only knobs and audio-visual indications of the device itself, thus without requiring the use of computers and additional external devices to configure each device.

20 Claims, 5 Drawing Sheets

(51) Int. Cl.
*H04W 12/08* (2021.01)
*H04W 84/18* (2009.01)

(56) References Cited

U.S. PATENT DOCUMENTS

| | | | | |
|---|---|---|---|---|
| 2010/0290359 | A1* | 11/2010 | Dewey | G05B 19/4185 370/252 |
| 2011/0093913 | A1* | 4/2011 | Wohlert | H04L 63/101 726/1 |
| 2012/0214414 | A1* | 8/2012 | Abel | H04L 63/0492 455/41.1 |
| 2014/0032732 | A1* | 1/2014 | Cox | H04L 41/0806 709/223 |
| 2014/0133379 | A1* | 5/2014 | Wang | H04W 24/02 370/311 |
| 2015/0072628 | A1* | 3/2015 | Mackie | H01Q 5/307 455/77 |
| 2016/0248525 | A1* | 8/2016 | Rauworth | H04B 17/23 |
| 2017/0135145 | A1* | 5/2017 | Amini | H04W 24/08 |
| 2017/0244472 | A1* | 8/2017 | Saito | H04B 7/155 |

OTHER PUBLICATIONS

Atcom: "ATCOM WiFi Mesh ATA Datasheet", Jan. 4, 2011 (Jan. 4, 2011), XP055348588, Retrieved from the Internet: URL:http://www.atcom.cn/uploadfile/2014/12 19/ata/mpOI/ATCOM MPOI Data sheet VI.O.pdf [retrieved on Feb. 22, 2017] the whole document.

Ajayi Ayomide et al: "A survey of rural Wireless Mesh Network (WMN) deployments", 2014 IEEE Asia Pacific Conference on Wireless and Mobile, IEEE, Aug. 28, 2014 (Aug. 28, 2014), pp. 119-125, XP032657824, DOI: 10.1109/APWIMOB.2014. 6920271[retrieved on Oct. 10, 2014] section I, section V subsection A.

Ruckus Wireless: "Best practice guide Wireless Mesh", Dec. 31, 2010 (Dec. 31, 2010), XP055348564, Retrieved from the Internet: URL:http://c541678.r78.cf2.rackcdn.com/app notes/bpg-wireless-mesh.pdf [retrieved on Feb. 22, 2017] p. 1, Signal Quality Verification; p. 5.

* cited by examiner

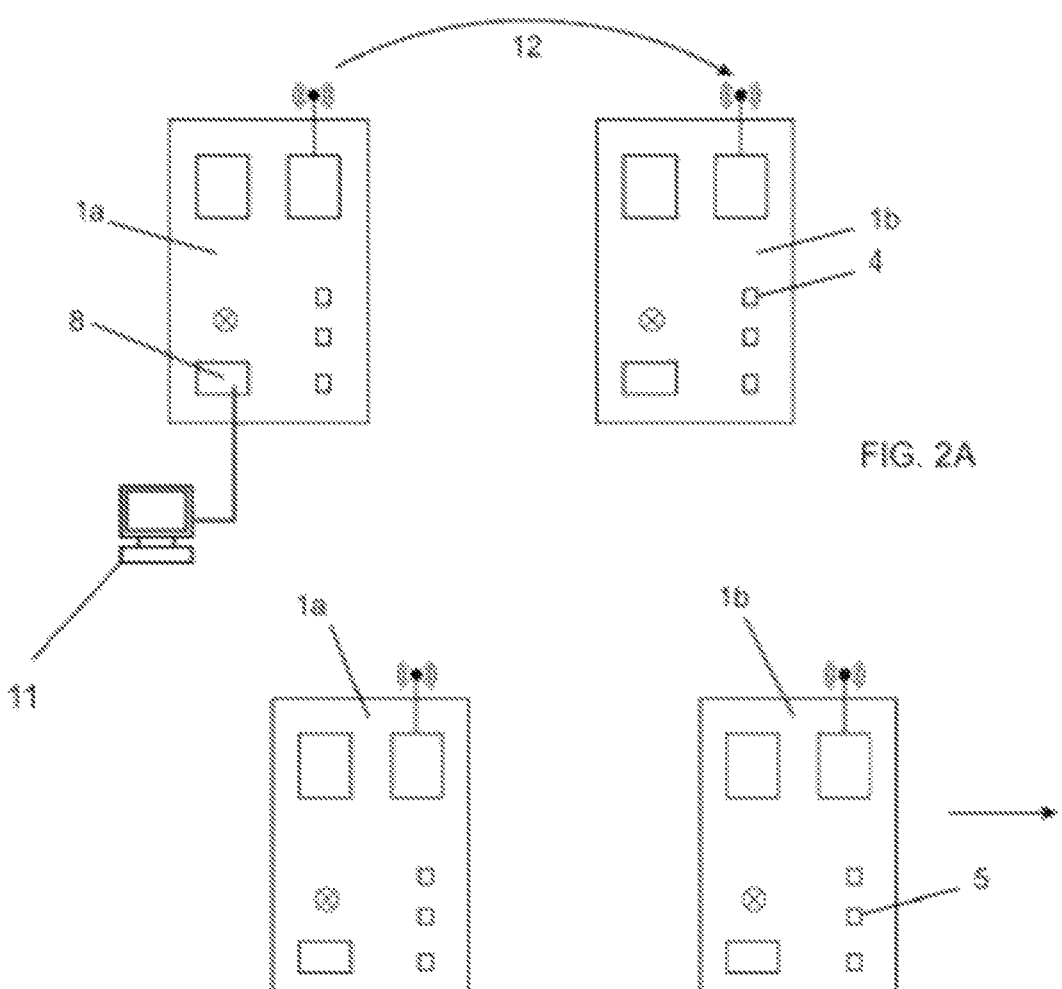
FIG. 2A
FIG. 2B
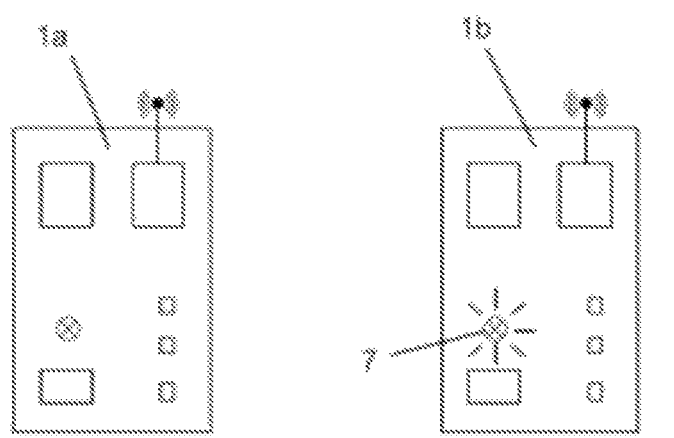
FIG. 2C

PROCESS FOR DEPLOYING A MESH NETWORK AND A MESH NETWORK NODE DEVICE

BACKGROUND OF THE INVENTION

The present invention relates to techniques to facilitate the deployment of a mesh network.

A mesh network is a wireless computer network consisting of multiple nodes or routers connected to each other, preferably by radio frequencies. Each node includes a radio interface to communicate with the other nodes. Each node communicates directly with the other nodes and, if they cannot directly reach a node, they use a routing protocol passing through several other nodes to reach any node of the mesh network. Examples of mesh network protocols are given by IEEE ("Institute of Electrical and Electronics Engineers") 802.11s or 802.15.4 standards, or OLSR ("Optimized link state routing protocol", RFC 3626) standard of IETF ("Internet Engineering Task Force), wherein any other proprietary protocols may be used.

Document US2014355476 discloses systems and methods to deploy a mesh network comprising access points and to deploy at least one server to a deployment region. An access points contains information based on GPS signals and communicates said information to deployment servers. The deployment servers guide the deployment of additional access points to the deployment region based on said GPS information.

SUMMARY OF THE INVENTION

The purpose of the invention is to allow the deployment of a mesh network to locations with no data transmission infrastructure in an improved and simplified manner compared to the known processes and devices.

In fact, the invention is related to a process for deploying a mesh network, the mesh network comprising node devices. The process includes the following steps:
  setting a first node device in configuration mode and configure a new network in the first node device;
  setting a second node device in configuration mode and within radio communication reach of the first node device so that the second node device is configured with said new network, wherein the configuration of the new network is copied from the first node device to the second node device;
  setting the second node device in deployment mode and moving it away from the first node device until the second node device activates a radio communication range limit indicator;
  securing the second node device;
  setting one of the node devices in service mode so that it is ready for data traffic.

The process may include the following steps prior to the step of setting one of the node devices in service mode:
  setting an additional node device in configuration mode and within radio communication reach of another node device so that the additional node device is configured with said new network, the configuration of the new network being copied from said other node device to the additional node device;
  setting the second node device in deployment mode and moving it away from the other node device until the additional node device activates a radio communication range limit indicator;
  securing the additional node device.

These steps may be repeated for a predetermined number of additional node devices.

Another subject matter of the invention is to provide a mesh network node device for deployment according to the process described above, which comprises:
  a radio transceiver module;
  a programmable logic circuit able to manage a mesh network communication protocol;
  a configuration mode selector setting the node device in a configuration mode in which it is ready to receive network configuration data sent by another node module;
  a deployment mode selector setting the node device in a deployment mode, in which it monitors the radio signal strength;
  a service mode selector setting the node device in a service mode, in which it is ready for mesh network data traffic.

The invention allows the deployment of a mesh network in locations with no data transmission infrastructure in a simple and efficient manner. The process can be performed by anyone without computer knowledge and without specific material.

The network configuration is performed only once in the first node device and is then replicated to all other node devices without giving extra work for the operator that is deploying the network. The latter deploy the mesh network concerned only about performing the process in the indicated sequence and sticking to the radio communication range limit indicator.

The resulting mesh network reaches the highest possible range and, therefore, an important deployment area can be covered by a minimum of node devices. This network is particularly advantageous to connect at least two remote locations within a deployment area. For example, a mesh network of this type can be deployed in rural areas or in areas where other communication networks have been damaged to enable data transmission between a data-collecting location to a remote data-processing location. Taking advantage of the characteristics of the mesh network, several additional data-collecting and data-processing locations can be included and all of them participate in the data routing in the mesh network.

Particularly advantageous examples of application of the invention may be illustrated by agricultural plantations, mining, infrastructure works, conditions in which a large territory usually has no suitable means of communication. For example, in an agricultural farm, a remote data collecting location is organized for automatically collecting data on raised animals, such as: weight, size, location, etc. These data are either available for external servers (enabling remote data processing) or locally processed in a computer, preferably located at the farm house or another safe place. A mesh network according to the invention is usually deployed between said computer and the data collecting locations. Although the process of mesh network deployment is simplified, the mesh network exhibits all the performance of a more complex mesh network. The wireless communication between the node devices is performed by multiple hops and the network is self-configuring and self-healing. Due to its flexible nature, it is easy to be configures and able to withstand failures.

It should be noted that the network can be expanded as necessary by adding new node devices.

Preferred characteristics that may complement the process and the device according to the invention are indicated below. The process and the device may include one of these characteristics or a set of these characteristics combined.

The process comprises the step of connecting a data processing device to one of the network node devices.

The process comprises the step of connecting a data collection device, which has a node device internally, to one of the network node devices.

The step of configuring a new network in a first node device comprises the step of communicating the name, the type of security and the password of said new network to said first node device.

The step of setting one of the node devices in service mode sets all other node devices in service mode, so that all node devices are ready for data traffic.

After the step of setting all node devices in service mode, the process comprises the step of locking the configuration of the mesh network, preventing the selection of the configuration mode in the node devices.

The process comprises the following steps related to the incorporation of an additional node device:
  unlocking the network configuration;
  setting one of the mesh network node devices in configuration mode;
  setting the additional node device in configuration mode and within radio communication range of the precedent node device so that the additional node device is configured with said new network, the configuration of the new network being copied from the precedent node device to the additional node device;
  setting the additional node device in deployment mode and moving it away from the precedent node device until the additional node device activates a radio communication range limit indicator;
  securing the additional node device;
  setting the additional node device in service mode.

The process comprises the following steps related to the replacement of a node device by a spare node device:
  unlock the network configuration;
  setting one of the mesh network node devices in configuration mode;
  setting the additional node device in configuration mode and within radio communication range of the precedent node device so that the additional node device is configured with said new network, the configuration of the new network being copied from the precedent node device to the additional node device;
  replacing a node device by the spare node device;
  setting a spare node device in service mode.

During the step of setting a second node device in configuration mode and within radio communication range of the first node device, the second node device is placed at a distance from the first node device, where occurs a maximum signal level, or in physical contact. For the physical contact alternative, a NFC "Near Field Communication" technology is used.

Only the first node device is able to be initially configured with the new network.

The selectors are keys or switches accessible from the outside or the inside of the node device body, and may be consolidated into a single key with different functions including the indicator.

The range limit indicator comprises a display informing the strength of the radio signal established between the node device and the other node device.

The range limit indicator comprises a device that outputs an audible warning when the acceptable limit of distance from the nearest node device is almost being achieved.

The configuration mode can be activated only if the node device is at a shorter distance than a predetermined security distance from the other node device or in physical contact.

Said predetermined security distance is close enough to obtain the maximum signal level.

The radio transceiver module can operate according the IEEE 802.15.4. or 802.15.4 standard, the OLSR standard of IETF or any other proprietary protocol.

The radio transceiver module operates at a frequency of 2.4 GHz or 900 Hz or other open frequency available.

The device comprises a power source.

The device is housed in a sealed box.

BRIEF DESCRIPTION OF THE DRAWINGS

The invention is detailed below by the description of a preferred embodiment, exemplified by the figures, in which:

FIGS. 2a to 2c illustrate the interaction between two node devices of FIG. 1;

DETAILED DESCRIPTION

Figure 4:
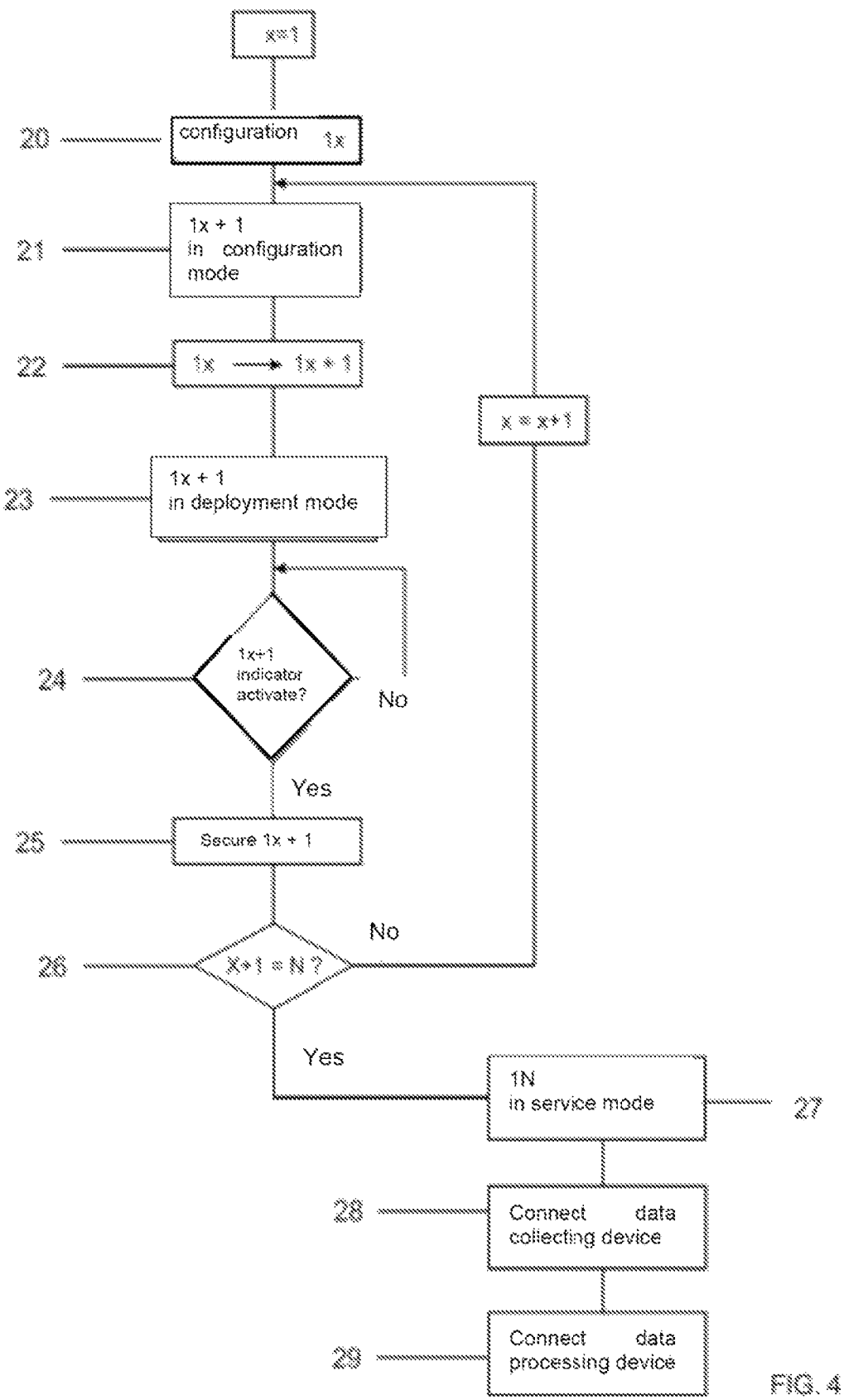
FIG. 4 is a flowchart illustrating the steps of the process of deploying a mesh network according to the invention.

The device schematically illustrated in FIG. 4 is a node device 1 used for deploying a mesh network.

A mesh network consists of a plurality of said node devices 1 interconnected between them by radio waves. Each node device 1 is connected to one or more of other node devices and every node device works as a router, so that the network traffic can go through different paths.

Figure 1:
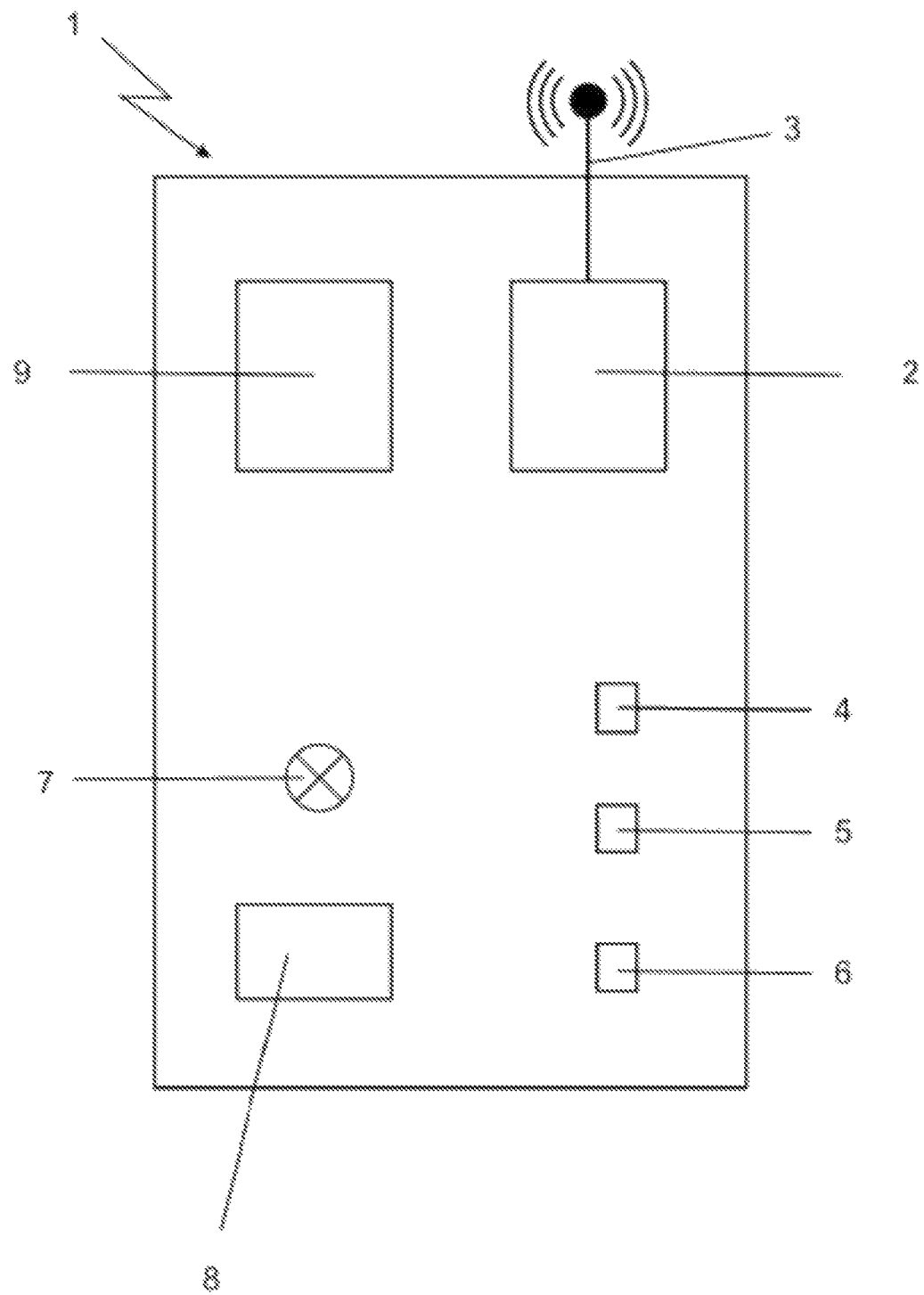
FIG. 1 schematically illustrates a node device according to the invention.

The node device of FIG. 1 comprises a radio frequency transceiver module 2 equipped with an antenna 3 and able to communicate wireless. In the present embodiment, the radio frequency transceiver module 2 is, for example, a module with DigiMesh proprietary standard that operates at 900 MHz, which may also be in accordance with IEEE 802.15.4 standard operated at a frequency of 2.4 GHZ or any other proprietary or open standard.

The node device 1 further comprises, in the present example of embodiment, a programmable logic controller (PLC) 9, a configuration mode selector 4, a deployment mode selector 5, a service mode selector 6 and a range limit indicator 7.

The PLC 9 is able to process data from selectors 4, 5, 6 and indicator 7, and from the network configuration as described below.

Selectors 4, 5, 6 may be keys or switches accessible from outside or from inside of the node device body 1, or any other interface. They may also be a single key with different functions including the indicator 7.

The node device 1 further comprises a communication interface 8 through which the node device 1 is able to communicate wired or wireless with an external device such as a computer to monitor the activity of the node device 1 or to configure it. The communication interface 8 can also be suitable to connect the node device 1 to external devices for processing or collecting data, as it will be explained below.

FIGS. 2a to 2c illustrate the base process to deploy a mesh network with a plurality of node devices 1 in locations with no infrastructure for data transmission. The process is exemplified by a core of two node devices 1a and 1b.

In FIG. 2a, a computer 11 is first connected to the communication interface 8 of a first node device 1a in order to configure a new network in the node device 1a. Said network configuration is commonly set by using the computer 11 to insert in the node device 1 data such as: network name, type of protection, configuration of the ports, etc. Any data related to the definition of a new network can, in this moment, be transferred to the node device 1a, which stores this configuration and becomes the first node device of the new mesh network that is being deployed. Said initial configuration can also be set remotely, in order to facilitate installation without requiring the physical presence of a more technical operator.

Alternatively, the node device 1 may optionally comprise a specific interface for user, allowing it to configure said new network and thereby avoiding the use of an external device such as the computer 11.

After configuring the network in the node device 1a, the operator does not need to repeat said configuration step in the other node devices 1. The network configuration introduced in the node device 1a will be replicated from a node device to another. To replicate the configuration to a second node device 1b, simply activate the configuration mode 4 of said second node device 1b to set it in configuration mode, thus making it available within radio communication range of the first node device 1a, which is also in configuration mode, however, mainly sending information.

During this step, the configuration mode selectors 4 must be simultaneously activated in nodes 1a and 1b. The two node devices 1a and 1b being within radio communication range from one another, the first node device 1a communicates (arrow 12) to the second node device 1b the network configuration it has stored.

The configuration of the new network is thus also configured in the second node device 1b. The latter is then positioned and secured in a suitable place within the range of the node device 1a.

After that, in FIG. 2b, the deployment mode selector 5 of the second node device 1b is activated to set said node device 1b in deployment mode. The node device 1b is subsequently moved away from the node device 1a and transported in the deployment area to a radio communication range limit. The purpose here is to deploy the second node device 1b as far as possible from the first node device 1a while simultaneously maintaining the radio communication between the two node devices 1a, 1b to ensure the operation of the network in order to optimize the number of node devices necessary to build the mesh network.

The second node device 1b is moved away from the first node device 1a until the situation indicated in FIG. 2c occurs, where the communication range limit indicator 7 shows the appropriate level indication. When the second node device 1b shows the appropriate radio communication limit indication 7, this means that the second node device 1b has reached said radio communication range point. If the second node device 1b is moved away from this point, the radio communication with the first node device 1a becomes inefficient or even inexistent. On the other hand, if the second node device is not moved away to that point, the range potential between the two node devices 1a, 1b will not be explored and the mesh network will need more node devices than the necessary to cover a certain area.

The indicator 7 may be a simple visual or audible signal, which, when activated, simply indicates that said limit was reached. Alternatively, the indicator 7 may be an indicator that exhibits the strength variation of the radio signal between the two node devices 1a, 1b, so that the activation of the indicator 7 corresponds to said strength falling below the acceptable limit for data traffic. This indicator may be continuous (for example, a curve in a display) or discrete (for example, a set of LEDs of different colors).

When the indicator 7 is activated, indicating that the node device 1b has reached the range limit, said node device 1b is then secured in its position. The node devices 1 can be secured in any manner suitable for the environment: mounted on a base or a pole, secured to an existing structure by mechanical means, etc.

Thus, after the installation of two first node devices 1a, 1b in a mesh network, the operation can be repeated for any other node device 1 to be added in relation to the last installed device, and so on.

For example, a third node device 1c is also set in configuration mode and within the range of any preconfigured device (in this case, of the first device 1a or the second node device 1b) similarly to when the second node device 1b was placed within the range of the first node device 1a. Said third node device 1c is then similarly set in deployment mode and moved away from the second node device 1b until its range limit indicator 7 is activated and it is consequently secured. Thus, the mesh network is successively built with the desired number of node devices 1.

After the last node device 1 is secured, it should be checked if all node devices are installed in their proper locations and are set in configuration mode. Then, the operator presses the service mode selector 6 on the last node device 1 that was just installed, or in any other node device 1, so that said node device 1 is ready for data traffic, i.e., to work as a mesh network router. Said node device 1 which was set in service mode sends a message in the mesh network for all other node devices 1 to also set themselves in configuration mode. The mesh network is thus ready to operate.

Figure 3:
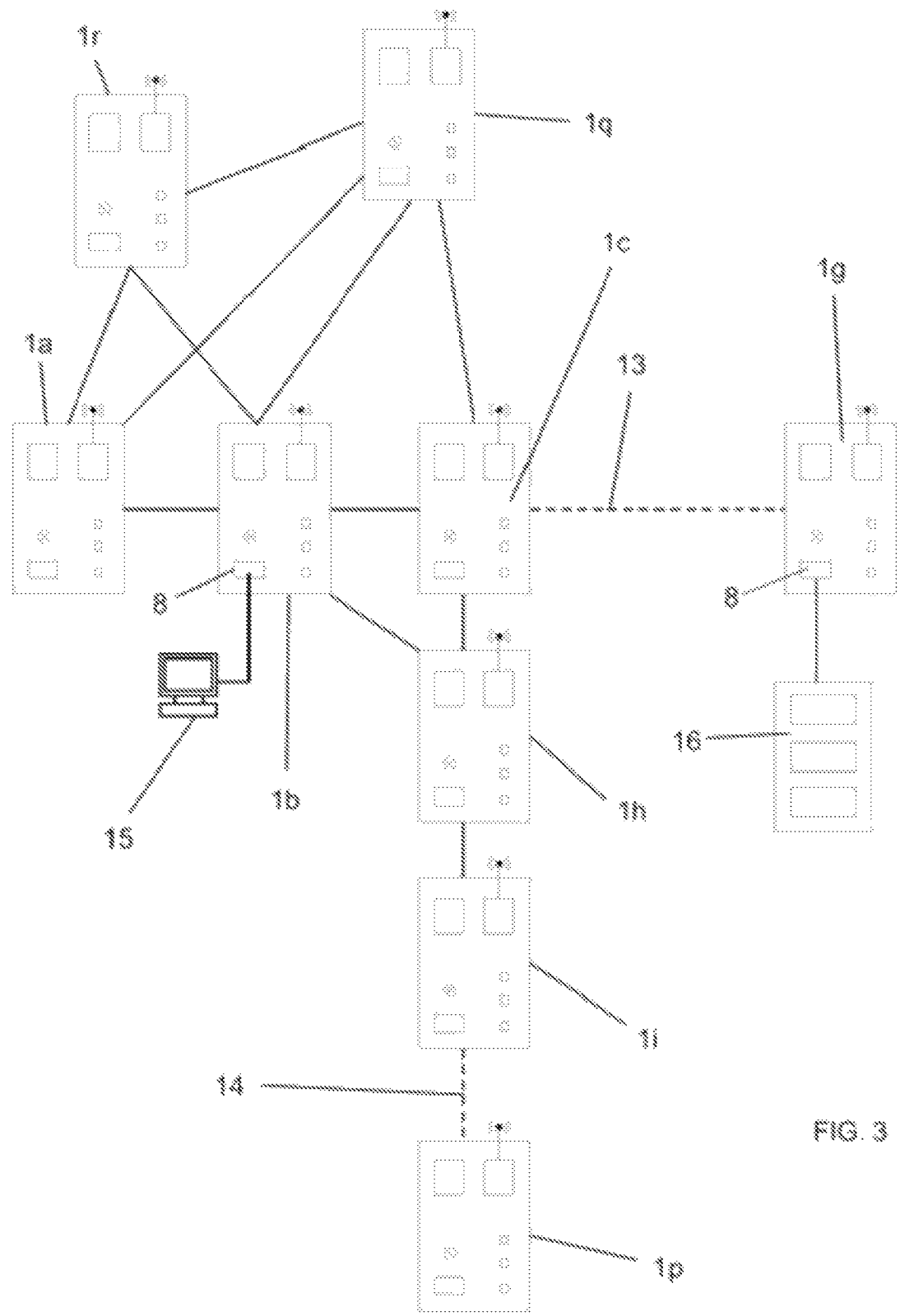
FIG. 3 represents the deployment of a mesh network according to the invention.

FIG. 3 illustrates such construction of a mesh network. Several purposes can be achieved at the same time during this construction.

A first example will be described, in which a mesh network seeks to reach a remote place of a location with no infrastructure for data transmission. The construction of the network is started with a first node device 1a and a second node device 1b, as disclosed in FIGS. 2a to 2c. Always with the same procedure, new node devices 1 are added to the mesh network and always secured in the radio transmission range limit of the precedent node device 1. The node device 1c is thus added and several node devices 1 are subsequently added (symbolized by dashed line 13 of FIG. 3), in this example being included until the node device 1g.

The construction of the mesh network can then enable the addition of other node devices 1 to extend the mesh network in another direction. The node device 1h is added from node device 1c, i.e., by replicating the network configuration of node device 1c. The node devices 1i and the following (symbolized by dashed line 14 of FIG. 3) are successively added up to a last node device 1p for this direction.

Subsequently, the construction of the mesh network may consider the addition of one more node device 1q and a node device 1r to extend the area covered by the mesh network around the previous node devices 1a and 1b.

In the case of a mesh network, each node device 1 automatically connects with all other node devices 1 that are within its range (connections symbolized by the solid line in FIG. 3). Therefore, for example, a node device 1b communicates directly with the node device 1a and with node device 1c, which is logical, since they were deployed in the same sequence, and also communicates directly with node devices 1r, 1q and 1h (It should be noted that said arrangement takes into account the topography of the location cited here as an example).

After the mesh network has been constructed as shown, it is possible to set access points for the data that will travel on the network. For example, a data processing device 15 is connected to the communication interface 8 of the node device 1b and a data collecting device 16 is connected to the communication interface 8 of the node device 1g.

The data processing device 15 may be, in this example, a computer. The data collecting device 16 may be, in this example, a set of sensors.

The data collected by the set of sensors 16 may thus travel through the mesh network to the computer 15, which works as a device for processing said data.

In each node device 1 of the mesh network, an access point can be determined, for example, for other data collecting devices 16 or data processing devices 15, particularly at the end of the network branches. Other node devices 1 may not be set as access point, but may serve only as the network router, such as for example node devices 1h and 1i.

The node devices 1 may also be connected to interfaces for other networks. For example, the computer 15 may be connected to the internet and offer an access point to the internet for the entire mesh network.

Optionally, for security reasons, the copy of the network configuration between two node devices 1 needs that the two are simultaneously set in configuration mode and that the two are at a distance from one another, where the signal level is maximum, or in physical contact, even for wireless transmission, using "Near Field Communication" technology to prevent the network configuration to be remotely copied.

The activation of the configuration selector 4 may also be protected and private, mechanically (for example, with a key) or electronically (for example, with a password).

Also for security reasons, since all node devices 1 are in service mode, the network configuration is locked and is not possible anymore to set any node device 1 in configuration mode with the purpose of copying the respective network configuration. To further add a new node device 1 to the mesh network, or to replace a defect node device 1 it is necessary to unlock the mesh network configuration. For this purpose, for example, the computer 15 may comprise a mesh network management program that is able to unlock the network configuration and authorize the selection of the configuration mode in the node devices 1. In another example, the mesh network configuration is directly unlocked in the first configured node device by using an external mobile device.

Optionally, it is possible to save the configuration profile of the first configure device by means of an external mobile device. This profile can be used in case said first device needs to be replaced, thus not requiring the configuration of the entire network again (since for security reasons the entire configuration has always to be initiated by the first node device). Alternatively, it is possible to remotely save the configuration profile in a cloud network instead of using an external mobile device.

FIG. 4 is a flowchart representing the procedure to construct a mesh network branch showing a great spacing between the node devices 1. The branch of the node devices 1a to 1g on FIG. 3, for example, was constructed according to said flowchart of FIG. 4.

The flowchart illustrates the construction of a mesh network branch with a number N of node devices 1. The node devices are identified in the flowchart as 1a, 1b, 1c, 1d, etc., up to 1N, 1N being the last node device to be deployed to said mesh network branch. In the flowchart, the variables x and x+1 represent the pair of node devices that are being deployed.

The flowchart starts with step 20, which is the configuration of a new network in a node device 1x (x being equal to 1), as disclosed in reference to FIG. 2a.

On step 21, the node device 1(x+1) (i.e., node device 1b) is set in configuration mode and within the range of node device 1a.

On step 22, the configuration of the new network is copied from node device 1a to node device 1b.

On step 23, node device 1b is set in deployment mode and moved away from device node 1a.

On step 24 is checked if the range limit indicator 7 of the node device 1b is activated. If applicable, step 25 is performed, where node device 1b is secured.

On step 26 is checked if x+1 is equal to N. If not, the flowchart repeats steps 21, 22, 23, 24 and 25 incrementing the variable x. If it is the case, the flowchart proceeds to step 27.

Thus, steps 21, 22, 23, 24 and 25 are repeated for all node devices 1 up to node device 1N, i.e., until every node device from 1a to 1N has the network configures and each of them is secured within the range of the node device 1 that precedes it.

On step 27, after the last node device 1N was installed, the service mode selector 6 is activated therein, thus setting the entire network in service mode. In service mode, the network is fully operational. It should be noted that the service mode may be activated in the last installed device 1N or in any other network device, thus not being necessary to return to the first node device 1 to activate the network.

On step 28, a data collecting device 16 is connected to one of the node devices 1. The data collecting device 16 comprises, alternatively, a node device in its interior, wherein the connection occurs by radio just as indicated in the description of FIGS. 2a to 2c. On step 29, a data processing device 15 is connected to another node device.

The algorithm of FIG. 4 thus allows the construction of a mesh network as that shown in FIG. 3.

Figure 5:
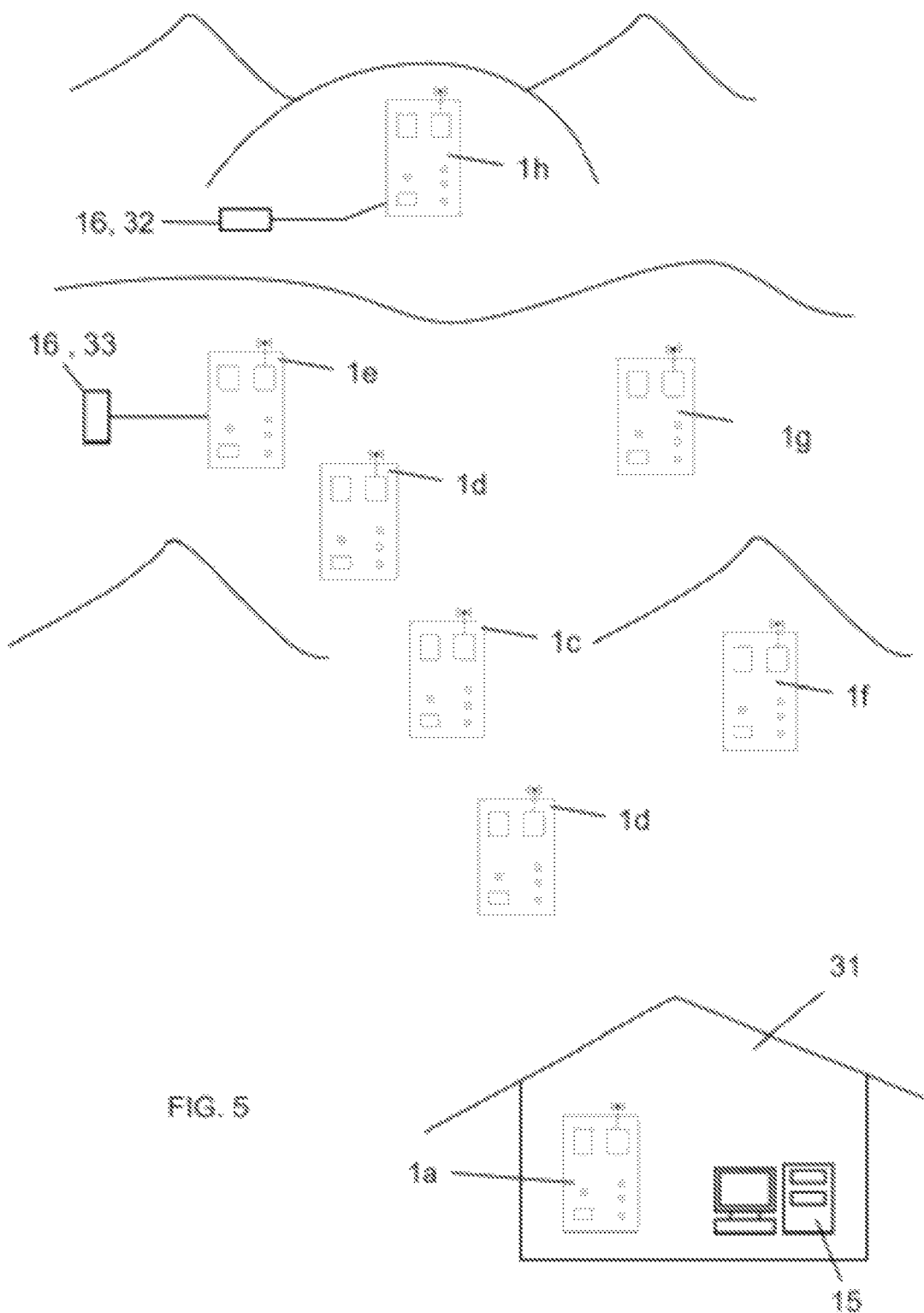
FIG. 5 schematically represents an example of deployed mesh network according to the invention.

FIG. 5 illustrates a specific example of deployment of said type of mesh network. The example relates to a cattle ranching farm wherein much of its territory has no infrastructure for data transmission. The farm includes an office 31 equipped with a computer 15. Said office 31 serves for managing the activities of the farm and processing the data that are collected regarding the cattle ranching.

The data are collected in remote locations spread across the farm by data collecting devices 16. In this example, the usual data collecting devices 16 are, for instance, an animal-weighing scale 32 and an animal identifier 33. The animal identifier 33 may be, for example, a chip reader capable of identifying animals, each animal being provided with a unique identifier.

According to the process described above, a mesh network is constructed with node devices 1a to 1h.

The node devices 1a, 1e and 1h are respectively connected via the respective communication interfaces 8 to a computer 15, to an animal identifier 33 and to a weighing scale 32.

In this example, it is advantageous that the node devices 1a to 1h are autonomous in term of power supply. They can, for example, be supplied by a battery charged by solar panels, individual for each node device 1, or a plurality thereof.

Thus, data can travel between the animal identifier 33, the weighing scale 32 and the computer 15, via the mesh network, across the farm, without the need of a preliminary installation prior to the deployment of the mesh network. The computer 25 can collect data to draw up statistics and help manage the farm, and can also monitor and perform maintenance (for example: program update) in the node devices 1a to 1h, in the animal identifier 33 and in the weighing-scale 32.

According to an embodiment of the present invention, the node devices 1 that are selected to be connected to the data processing devices 15 or to the data collecting devices 16 can be replaced by terminal node devices 1 comprising the same characteristics of other node devices and which include the others, together with the communication interface 8, a data module for the connection and the processing of a particular type of data. For example, the node device 1a can be replaced by a terminal node device that has the same function as the node device 1a and comprises, in addition, specific connection ports to connect with a computer 15 and is able to communicate with the computer according to a particular protocol. Similarly, the node devices 1e or 1h can be replaced by terminal node devices which are specifically adapted to be respectively connected to an animal identifier 33 and a weighing scale 32.

Optionally, the node devices 1a to 1h may be specifically adapted to this example of deployment of the mesh network in an external location. For example, the node devices 1a, 1e and 1h that are connected to a data collecting 32, 33 or processing device 15 having externally accessible connectors for said connection. All the other node devices 1b, 1c, 1d, 1f and 1g, which only work as a router for the mesh network, can be housed inside a closed box and sealed with no connection ports accessible from the outside.

According to another embodiment of the invention, in order to reduce the risk of undesired access by third parties, the first node device, to which the network configuration was initially communicated, is the only node device capable of initiate the configuration of a new network. For example, the device node 1a is said first node device that has received the initial network configuration from the computer 15. Only said node device 1a, which is protected in the farm's office 31, has the possibility of receiving a new network configuration, all the other node devices 1b, 1c, 1d, 1e, 1f, 1g, 1h can only replicate the network configuration that was initiated by node device 1a.

Since an example of preferred embodiment was described, it should be understood that the scope of the present invention encompasses other possible embodiments, being limited only by the content of the appended claims, therein included possible equivalents thereof.

The invention claimed is:

1. A process for deploying a mesh network, the process comprising:
setting a first node device in a configuration mode and configuring a new network in the first node device;
setting a second node device in a configuration mode and within radio communication range of the first node device so that the second node device is configured with the new network, a configuration of the new network is copied from the first node device to the second node device;
setting the second node device in a deployment mode and moving the second node device away from the first node device until the second node device activates a radio communication range limit indicator included in the second node device;
securing the second node device; and
setting at least one of the first node device or the second node device in a service mode so that the at least one of the first node device or the second node device is ready for data traffic,
wherein setting one of the first node device or the second node device in the service mode sets all node devices in the service mode, so that all the node devices are ready for data traffic, and
wherein after setting all the node devices in the service mode, the process further comprises locking a configuration mode, thus preventing selection of the configuration mode in the node devices.

2. The process according to claim 1, further comprising:
setting an additional node device in a configuration mode and within radio communication range of another node device so that the additional node device is configured with the new network, the configuration of the new network being copied from the another node device to the additional node device;
setting the additional node device in a deployment mode and moving the additional node device away from the another node device until the additional node device activates a radio communication range limit indicator included in the additional node device;
securing the additional node device.

3. The process according to claim 2, wherein claim 2 is repeated for each of a predetermined number (N) of additional node devices.

4. The process according to claim 1, wherein configuring the new network in the first node device comprises communicating a name, type of security and a password of the new network to the first node device.

5. The process according to claim 1, further comprising:
unlocking the configuration mode;
setting one of the first node device or the second node device in the configuration mode;
setting an additional node device in the configuration mode and within radio communication range of the one of the first node device or the second node device that is set in the configuration mode so that the additional node device is configured with the new network, the configuration of the new network being copied from the one of the first node device or the second node device that is set in the configuration mode to the additional node device;
setting the additional node device in a deployment mode and moving the additional node device away from the one of the first node device or the second node device that is set in the configuration mode until the additional node device activates a radio communication limit range indicator;
securing the additional node device; and
setting the additional node device in a service mode.

6. The process according to claim 1, further comprising:
unlocking the configuration mode;
setting one of the first node device or the second node device in the configuration mode;
setting an additional node device in the configuration mode and within radio communication range of the one of the first node device or the second node device that is in the configuration mode so that the additional node device is configured with the new network, the configuration of the new network being copied from the one of the first node device or the second node device to the additional node device;

replacing one of the first node device or the second node device with the additional node device; and setting the additional node device in a service mode.

7. The process according to claim 1, wherein setting the second node device in the configuration mode and within radio communication range of the first node device further includes placing the second node device at a distance from the first node device where a maximum signal level occurs, or in physical contact.

8. The process according to claim 7, wherein, the distance from the first node device where the maximum signal level occurs is an alternative of the physical contact, and the alternative of the physical contact is a Near Field Communication (NFC) contact.

9. The process according to claim 1, wherein only the first node device is initially configured with the new network.

10. A mesh network node device comprising:
a radio transceiver module;
a programmable logic circuit capable of managing a mesh network communication protocol;
a configuration mode selector setting the mesh network node device in a configuration mode in which the mesh network node device is ready to receive configuration data sent by a second node device;
a deployment mode selector setting the mesh network node device in a deployment mode, in which the mesh network node device monitors a strength of a radio signal;
a service mode selector setting the mesh network node device in a service mode, in which the mesh network node device is ready for mesh network data traffic; and
a radio communication range limit indicator capable of showing, when the deployment mode is selected, that the mesh network node device has achieved a radio communication range limit to the second node device,
wherein the configuration mode selector, the deployment mode selector, and the service mode selector are configured to be consolidated in a single actuator, the single actuator also including the radio communication range limit indicator.

11. The mesh network node device according to claim 10, wherein the radio communication range limit indicator comprises a display showing the strength of the radio signal established between the mesh network node device and the second node device.

12. The mesh network node device according to claim 10, wherein the radio communication range limit indicator comprises a device that outputs an audible warning when an acceptable limit of distance from a nearest node device is almost being achieved.

13. The mesh network node device according to claim 10, wherein the configuration mode is configured to be activated only if the mesh network node device is at a distance shorter than a predetermined security distance from the second node device or in physical contact.

14. The mesh network node device according to claim 13, wherein the predetermined security distance is close enough to obtain a maximum signal level.

15. The mesh network node device according to claim 10, wherein the radio transceiver module is configured to operate according to an Institute of Electrical and Electronics Engineer (IEEE) 802.15.4 standard, an Optimized Link State Routing (OLSR) standard of Internet Engineering Task Force (IETF), or any other proprietary protocols.

16. The mesh network node device according to claim 15, wherein the radio transceiver module is configured to operate at a frequency of 2.4 GHz or 900 MHz or other open frequency available.

17. The mesh network node device according to claim 10, further comprising a power source.

18. The mesh network node device according to claim 10, characterized in that the mesh network node device is housed in a sealed box.

19. A process for deploying a mesh network, the process comprising:
setting a first node device in a configuration mode and configuring a new network in the first node device;
setting a second node device in a configuration mode and within radio communication range of the first node device so that the second node device is configured with the new network, a configuration of the new network is copied from the first node device to the second node device;
setting the second node device in a deployment mode and moving the second node device away from the first node device until the second node device activates a radio communication range limit indicator included in the second node device;
securing the second node device;
setting at least one of the first node device or the second node device in a service mode so that the at least one of the first node device or the second node device is ready for data traffic; and
saving a configuration file of the new network to an external mobile device.

20. A process for deploying a mesh network, the process comprising:
setting a first node device in a configuration mode and configuring a new network in the first node device;
setting a second node device in a configuration mode and within radio communication range of the first node device so that the second node device is configured with the new network, a configuration of the new network is copied from the first node device to the second node device;
setting the second node device in a deployment mode and moving the second node device away from the first node device until the second node device activates a radio communication range limit indicator included in the second node device;
securing the second node device;
setting at least one of the first node device or the second node device in a service mode so that the at least one of the first node device or the second node device is ready for data traffic; and
saving a configuration file of the new network to a cloud network device.

* * * * *